(12) United States Patent
Bodie

(10) Patent No.: US 7,270,147 B2
(45) Date of Patent: Sep. 18, 2007

(54) ADJUSTABLE VARIABLE FLOW FERTILIZER VALVE

(75) Inventor: Cameron Dwight Bodie, Moose Jaw (CA)

(73) Assignee: CNH Canada, Ltd. (CA)

( * ) Notice: Subject to any disclaimer, the term of this patent is extended or adjusted under 35 U.S.C. 154(b) by 314 days.

(21) Appl. No.: 10/704,166

(22) Filed: Nov. 7, 2003

(65) Prior Publication Data

US 2005/0098216 A1    May 12, 2005

(51) Int. Cl.
    *F16K 15/02* (2006.01)
(52) U.S. Cl. ............ 137/540; 137/543.17; 137/543.21; 137/883; 251/337
(58) Field of Classification Search ............... 137/515, 137/515.5, 540, 543.17, 883, 533.17, 543.21; 251/337
    See application file for complete search history.

(56) References Cited

U.S. PATENT DOCUMENTS

| | | | |
|---|---|---|---|
| 2,505,093 A | | 4/1950 | Brock |
| 2,538,364 A | * | 1/1951 | James et al. ............. 137/515.5 |
| 2,755,816 A | * | 7/1956 | Collins ....................... 137/496 |
| 3,099,999 A | * | 8/1963 | Vismara ................. 137/543.23 |
| 3,670,766 A | * | 6/1972 | Tyson et al. ............. 137/515.5 |
| 5,090,446 A | * | 2/1992 | Hunter et al. ............... 137/540 |
| 5,875,811 A | | 3/1999 | Jacobson |
| 6,360,766 B1 | * | 3/2002 | Sawert et al. ............ 137/15.18 |
| 6,431,521 B1 | * | 8/2002 | Jones ......................... 251/319 |
| 6,513,545 B2 | * | 2/2003 | Rhone et al. ............... 137/529 |

* cited by examiner

*Primary Examiner*—Ramesh Krishnamurthy
(74) *Attorney, Agent, or Firm*—Rebecca Henkel

(57) ABSTRACT

A valve assembly comprising a body member forming a channel having first and second ends, forming a seat surface within and at the first end of the channel about an orifice that faces in the direction of the second end, the channel forming a first coupler at the second end, a closure member forming a closing surface and an oppositely facing bearing surface, the closing surface configured to be received on the seat surface to close the orifice, the closure member received within the channel with the closing surface facing the seat surface, a spring member having first and second ends and received within the channel with the first end of the spring member contacting the bearing surface and an adjustment member having first and second ends and forming a second coupler at the first end of the adjustment member that cooperates with the first coupler to mechanically link the adjustment member within the channel in various relative juxtapositions, one of the adjustment member and the body member forming an outlet passage from the channel, whereby, the adjustment member position within the channel is adjustable to alter the degree of spring compression and also the pressure on the closure member.

23 Claims, 9 Drawing Sheets

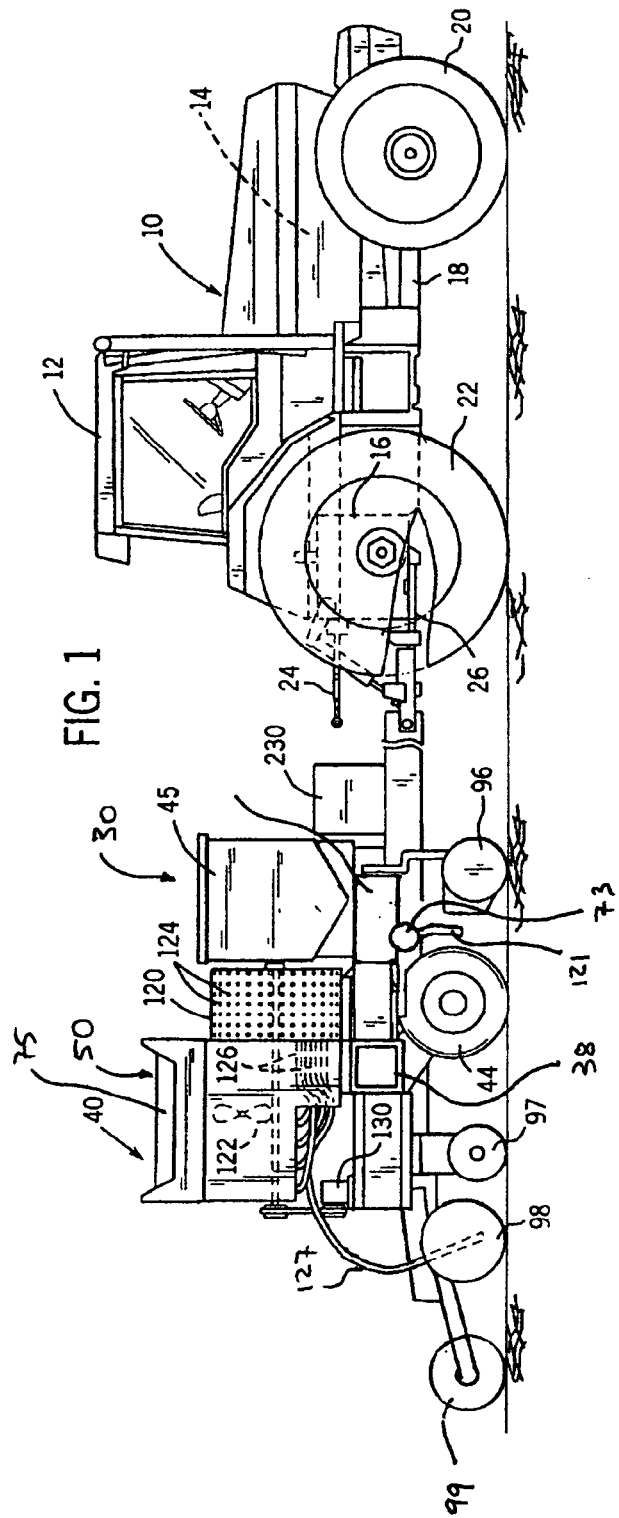

ADJUSTABLE VARIABLE FLOW FERTILIZER VALVE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates generally to variable flow valve assemblies and more specifically to an adjustable flow rate valve assembly for use with a liquid fertilizer sprayer implement.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

When agricultural liquids are applied to crops it is typically desirable to apply an ideal amount of liquid to each crop. Thus, for instance, when liquid fertilizer is applied to crops, to ensure that the crops grow at the same rate and are harvestable at the same time, it is desirable that the same amount of liquid fertilizer be applied to each crop. One way to apply an agricultural liquid to crops is by towing a liquid dispensing assembly behind a tractor through a field where the implement includes a wheel supported liquid container/tank, a manifold, a pump and valves. Here, the manifold typically includes an elongated member that forms a channel that is generally perpendicular to the trajectory of tractor travel through the field. In some cases the manifold will be 16 or even 32 crop row units wide and will form separate outlet apertures that generally reside above each of the rows that the manifold passes over during transport.

Valves are positioned at each of the openings and hence above each of the crop rows. Each valve includes a spring loaded needle member having a closure surface that is biased against a seat surface to close the valve. The valve is juxtaposed with respect to the manifold such that pressure within the manifold is applied to the closure surface. The pump pumps liquid from the container to the manifold and, when manifold pressure exceeds a cracking pressure, the manifold pressure forces the needle member into an open position and hence liquid is dispensed through the valve.

The rate of liquid dispensation must be controllable in most agricultural applications for two reasons. First, some crops may require more of the dispensed liquid than other crops and, indeed, even within a single field the same type of crop may require different amounts of the dispensed liquid in different sections of the field. Second, even where each section of a field requires the same amount of liquid, where tractor speed is varied, to deliver the same amount of liquid to crops, the rate of dispensing must be modified. For instance, where a tractor moves at five miles an hour and a first rate of dispensing occurs, if the tractor speed is increased to ten miles an hour, to dispense the same amount of liquid per meter within the field, the rate of dispensing likewise must be increased by 100%.

In the system described above rate of dispensing is generally controllable by controlling the pressure within the manifold. To this end, after a valve cracking pressure is exceeded, the size of the gap between a valve seat surface and closure surface changes as a function of the pressure within the manifold. Thus, as pressure within the manifold increases, the rate of liquid dispensed through a valve likewise increases.

One problem that has occurred with liquid delivery systems like the one described above is that it is expensive to manufacture valve springs that have identical loading characteristics. Where less expensive and less uniform springs are employed, the cracking pressures of the valves used on a single assembly may be very different and, indeed, the pressures that result in uniform opening of the valves may be different. Thus, as the manifold pressure is constant throughout the manifold, the end result when non-uniform springs are used within a valve is that the rate of dispensing with systems like the one described may be different for each of the valves on a system.

Thus, it would be advantageous to have a liquid dispensing assembly where valve construction enables a valve user to modify relative juxtapositions of valve components to compensate for different spring loading characteristics.

BRIEF SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

It has been recognized that a simple adjustment member may be provided that alters the location of an anchoring end of a valve spring thereby increasing or decreasing the pressure applied by the valve spring on a closure member and against the force of pressure within the manifold. When such an adjustment member is provided, valves can be tested to determine if valve flow rate with respect to manifold pressure is acceptable and, where the pressure to flow characteristics are not acceptable, the adjustment member can be adjusted to alter the characteristics. In some cases the valve characteristics will be set after assembly and prior to shipping the valves and in other cases end users will be able to modify valve operating characteristics via the adjustment members.

Consistent with the above comments, at least some embodiments of the present invention include a valve assembly comprising a body member forming a channel having first and second ends, forming a seat surface within and at the first end of the channel about an orifice that faces in the direction of the second end, the channel forming a first coupler at the second end, a closure member forming a closing surface and an oppositely facing bearing surface, the closing surface configured to be received on the seat surface to close the orifice, the closing member received within the channel with the closing surface facing the seat surface, a spring member having first and second ends and received within the channel with the first end of the spring member contacting the bearing surface and an adjustment member having first and second ends and forming a second coupler at the first end of the adjustment member that cooperates with the first coupler to mechanically link the adjustment member within the channel in various relative juxtapositions, one of the adjustment member and the body member forming an outlet passage from the channel, whereby, the adjustment member position within the channel is adjustable to alter the degree of spring compression and also the pressure on the closure member.

In at least some cases the adjustment member forms the outlet passageway between the adjustment member first and second ends. In addition, in some cases the first coupler includes a threaded second end of the channel and the second coupler includes a threaded first end of the adjustment member.

Some embodiments include a valve assembly comprising a body member forming an annular channel having first and second ends, forming an annular seat surface within and at the first end of the channel about an orifice that faces in the direction of the second end, the channel threaded at the second end, a closure member forming a closing surface and an oppositely facing bearing surface, the closing surface configured to be received on the seat surface to close the orifice, the closing member received within the channel with the closing surface facing the seat surface, a helical spring having first and second ends and received within the channel with the first end of the spring contacting the bearing surface and an adjustment member forming an annular outlet channel between first and second adjustment member ends, the adjustment member threaded at the first end of the adjustment member, the first end of the adjustment member threadably received within the body member channel and contacting the second end of the spring thereby at least partially compressing the spring and placing pressure on the closure member.

Moreover, some embodiments include a flow divider apparatus comprising a header member forming a header channel, at least one inlet and at least two outlets, a liquid source linked to the header channel inlet, a separate valve assembly for each of the header member outlets, each valve assembly including: a body member forming a body member channel having first and second ends, forming a seat surface within and at the first end of the body member channel about an orifice that faces in the direction of the second end, the body member channel threaded at the second end, the first end of the body member linked to one of the header member outlets, a closure member forming a closing surface and an oppositely facing bearing surface, the closing surface configured to be received on the seat surface to close the orifice, the closing member received within the channel with the closing surface facing the seat surface, a spring member having first and second ends and received within the channel with the first end of the spring member contacting the bearing surface and an adjustment member forming an annular outlet channel between first and second adjustment member ends, the adjustment member threaded at the first end of the adjustment member, the first end of the adjustment member threadably received within the body member channel and contacting the second end of the spring member thereby at least partially compressing the spring and placing pressure on the closure member. These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and:

FIG. 1 is a side perspective view of a tractor pulling an agricultural implement according to at least one aspect of the present invention;

DETAILED DESCRIPTION OF THE INVENTION

Figure 2A:
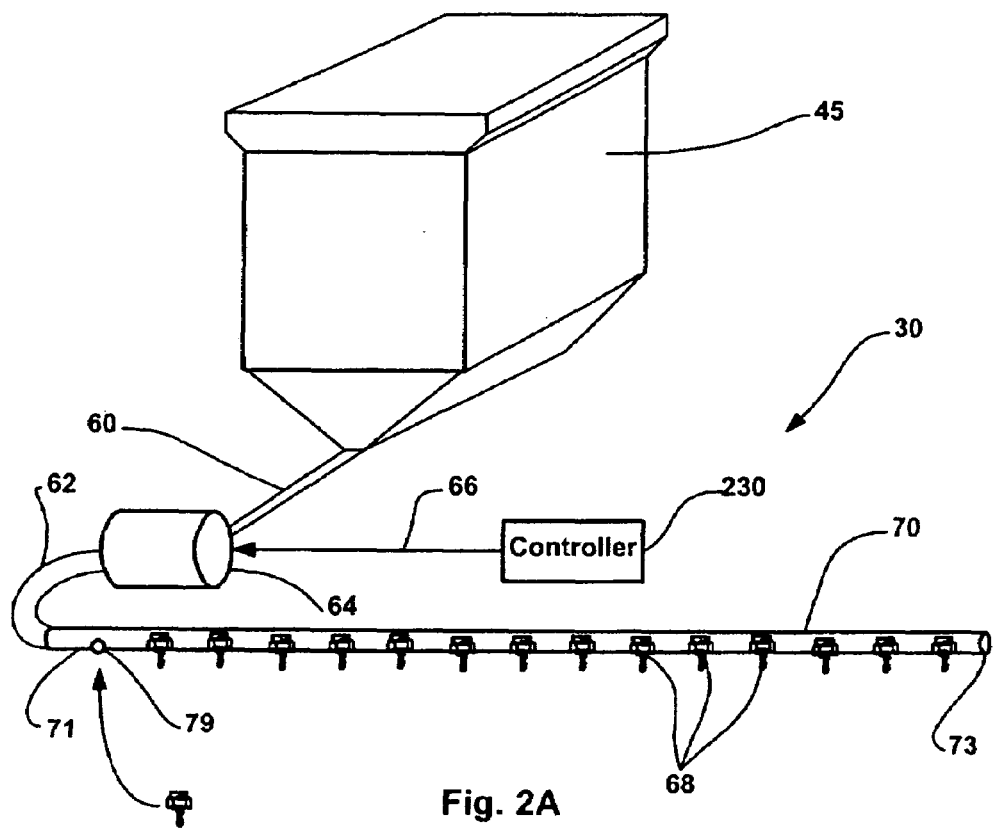
FIG. 2A is a schematic diagram illustrating the liquid delivery assembly of FIG. 1 in greater detail.
Figure 4:
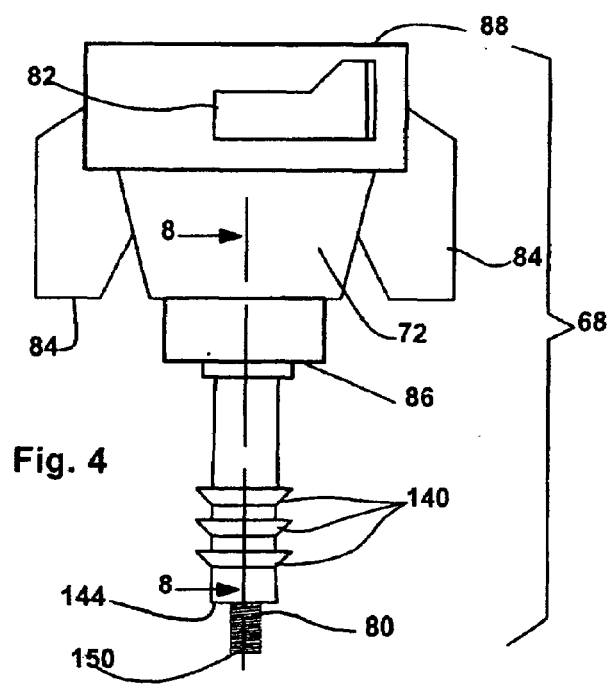
FIG. 4 is a side elevational view of the valve assembly of FIG. 3, albeit in an assembled state.

One or more specific embodiments of the present invention will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Turning now to the drawings where like reference numbers correspond to similar elements throughout the several views and, more specifically, referring to FIG. 1, the present invention will be described in the context of an exemplary agricultural assembly 40 shown attached to a tractor 10, including an operator control cab 12. Tractor 10 includes an engine compartment 14, the engine of which is coupled to a drive train 16 and 18 to the rear and front wheels 22 and 20, respectively, of the tractor 10. Tractor 10 may be coupled by a three point hitch 24 or by means of a standard draw bar 26 to a frame 38 of implement 40 for towing implement 40 across agricultural fields. Implement 40, as illustrated in FIG. 1, includes ground support wheels 44 connected to the frame 38 which in turn supports a plurality of row planters, in the illustrated instance 16 (not separately illustrated), in spaced apart relation across frame 38.

Several components are mounted to frame 38 and other supporting structure appended thereto including a controller 230, a liquid (e.g., fertilizer, herbicide, insecticide, etc.) distribution assembly 30 and a seeding assembly 50. Hereinafter, unless indicated otherwise, assembly 50 will be referred to as a fertilizer assembly although other fluid dispersing assemblies are contemplated. Fertilizer assembly 30 includes a fertilizer bin or container 45 and seeding assembly 50 includes one or more seed hoppers 75 for storing fertilizer and seed during transport. Generally, referring still to FIG. 1, fertilizer is supplied to the ground through a metering device which controls the flow of the fertilizer and keeps it moving from container 75 to the ground as implement 40 is moved over a field. The fertilizer precedes the seed, and is deposited via fertilizer tubes (see 121 in FIG. 1) adjacent (e.g., two inches to the side of) each seed furrow to be subsequently formed. To this end, a separate disk 96 associated with each row unit opens a furrow and fertilizer is deposited into the furrow. Second, furrow openers 97, associated with each of the row units form additional furrows to the sides of the first furrows for depositing seed at predetermined intervals. A furrow closer 98 closes the loose soil over the deposited seeds. A furrow packing wheel 99 gently rolls over the closed furrow and tamps the soil to insure the seed remains within the soil.

Here, it should be appreciated that while fertilizer assembly 30 is illustrated as being located in front of seeding assembly 50 and is described as depositing fertilizer to the side of the seed furrows, other embodiments are contemplated wherein the fertilizer assembly may deposit fertilizer subsequent to seed application and, in some cases, directly into the furrows receiving the seed or, in some cases, onto the packed soil that covers the applied seed. Moreover, in some cases the liquid fertilizer assembly 30 may be used with other fertilizer assemblies such as dry fertilizer assemblies or, in some cases, may be used as part of a fertilizer implement that does not include a seeding assembly.

Seeding assembly 50 includes a well known drum or barrel type dispenser 120 which is fed seed or the like from hopper 75 and, due to air pressure provided by a blower 122, maintains seed in peripheral, spaced apart, row-like apertures 124 circumscribing the barrel 120 of the seed applicator. Seed pick-up tubes 126, disposed within barrel 120 conduct air and single seeds at a time to the row units and thereby to the ground or soil there below. The amount of seed output through the tubes per unit of time (i.e. the rate of seed deposition), such as by tube 127, is dependent upon the speed of rotation of barrel 120. Barrel 120 is rotated by a drive means 130 under control of local controller 230.

The amount or dosage of farming material to be applied for each portion of a field is calculated by a processing located within tractor cab 12. The dosage to be applied is converted to the amount of actuator or applicator motion per distance of the planter traveled and sent by way of a bus 200 to implement controller 230. Controller 230 is equipped with a ground speed sensor (not illustrated) and uses signals therefrom to determine the proper amount or dosage of farming material, whether it be seed or fertilizer (or, in some cases, herbicide or insecticide), to deposit at any time. Once proper dose is determined, processor 230 controls the seeding assembly drum 120 speed to affect desired seed dispensation. In addition, controller 230 controls fertilizer dispensing assembly 30 as described below to deliver the required amount of fertilizer via tubes 121.

Referring now to FIGS. 1 and 2A, in addition to container 45, fertilizer assembly 30 includes a pump 64, a manifold 70, a plurality of valve assemblies, three of which are identified collectively by numeral 68 and distribution tubes 60 and 62. Tube 60 connects the bottom of container 45 to the inlet of pump 62 while tube 62 connects the outlet of pump 64 to the inlet of manifold 70. Controller 230 is linked to pump 64 via a control line and, as its label implies, controls pump operations including turning pump 64 on and off and controlling the speed of the pump impeller (not separately illustrated).

Manifold 70 may take any of several different forms. In the illustrated example manifold 70 is an elongated and rigid pipe member having an inlet end 71 and a distal capped end 73 opposite the inlet end 71. Manifold 70 forms a generally open manifold channel (not illustrated) along its length. Member 70 forms a series of generally downward facing openings, one of which is identified by numeral 79, one opening 79 for each of the row units included in implement 40. Thus, in the present example, member 70 includes sixteen separate openings that are generally equispaced along its length, one opening for each of the sixteen separate row units included on implement 40.

Surrounding each opening 79 manifold 70, in at least some embodiments, includes some type of coupling mechanism that cooperates with another coupling mechanism on one of the valve assemblies 68 to secure the valve assembly to manifold 70. For example, referring to FIG. 2B, an exemplary coupling mechanism 300 is illustrated. Mechanism 300 includes a rigid cylindrical nipple member 302 that surrounds an associated manifold opening (see again 79 in FIG. 2A) and that extends to an open distal end that forms a flat annular sealing surface 304. Thus, nipple member 302 forms a channel 306 from the inside of manifold 70 that opens at a distal end. Two locking members 308 extend laterally from opposite sides of nipple member 302 that cooperate with other structures to be described below to secure a valve assembly 68 to nipple member 302. Other mechanical coupling configurations are contemplated. Here it must suffice to say that the coupling mechanism must be robust and must form a hermetic seal between the manifold and the valve assembly 68.

Referring still to FIG. 2A, each of valve assemblies 68 has a similar configuration and operates in a similar manner and therefore, in the interest of simplifying this explanation, only one of valve assemblies 68 will be described here in detail. To this end, referring also to FIG. 3, exemplary valve assembly 68 includes a manifold coupling member 72, a body member 74, a closure member 76, a spring member 78 and an adjustment member 80. Manifold coupling member 72 has top and bottom ends 88 and 86, respectively and forms an internal channel 83 that extends, generally, from the top end 88 through to the bottom end 86. In at least some embodiments, some type of coupling mechanism is provided proximate top end 88 which may be configured to cooperate with coupling mechanism 300 on manifold 70 (see again FIG. 2B) to couple coupling member 72 to manifold 70 such that one of the openings 79 in manifold 70 opens into channel 83 and is hermetically sealed therewith. To this end, referring still to FIG. 3, member 72 generally includes three integral sections including a first coupling section 310, a sealing section 312 and a second coupling section 314.

Figure 2B:
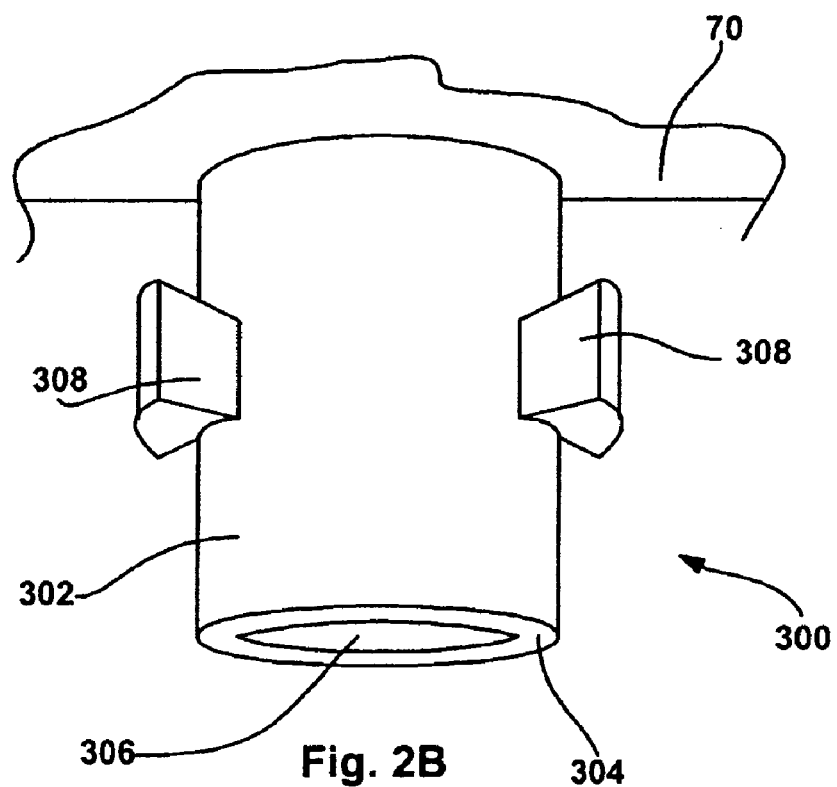
FIG. 2B is a side perspective view of a coupling mechanism extending from a manifold of FIG. 2A.

First section 310 is cylindrical and forms two apertures (one shown as 82 in FIG. 3) in opposite sides thereof that are formed to tightly receive the locking members 308 that extend from one of the nipple members 302 (see again FIG. 2B). In addition, referring also to FIG. 13, the internal surface of channel 83 forms passageways 316 that are sized and juxtaposed to pass locking members 308. Each of passageways 316 open at lower ends thereof into one of apertures 82. To couple member 72 to one of nipple members 302, locking members 308 are aligned with passageways 314, member 72 is slid over nipple member 302 and then member 72 is rotated until locking members 308 are jammed into the restricted portions of apertures 82. To help rotate coupling members 72 during installation, two arm members 84 are provided on each member 72 that extend from opposite sides of the external.

Figure 13:
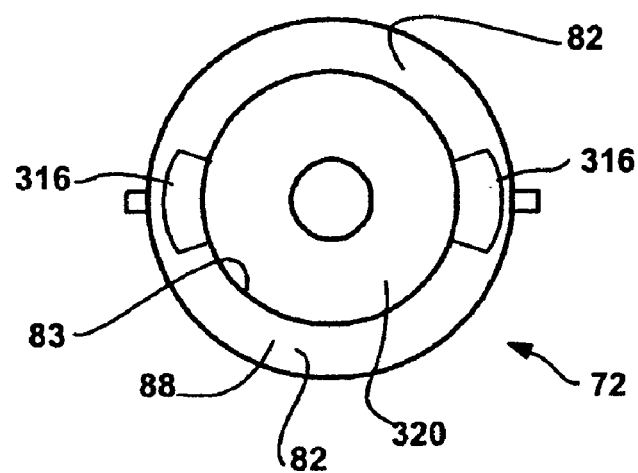
FIG. 13 is a plan view of a manifold coupling member of the valve assembly of FIG. 3.
Figure 3:
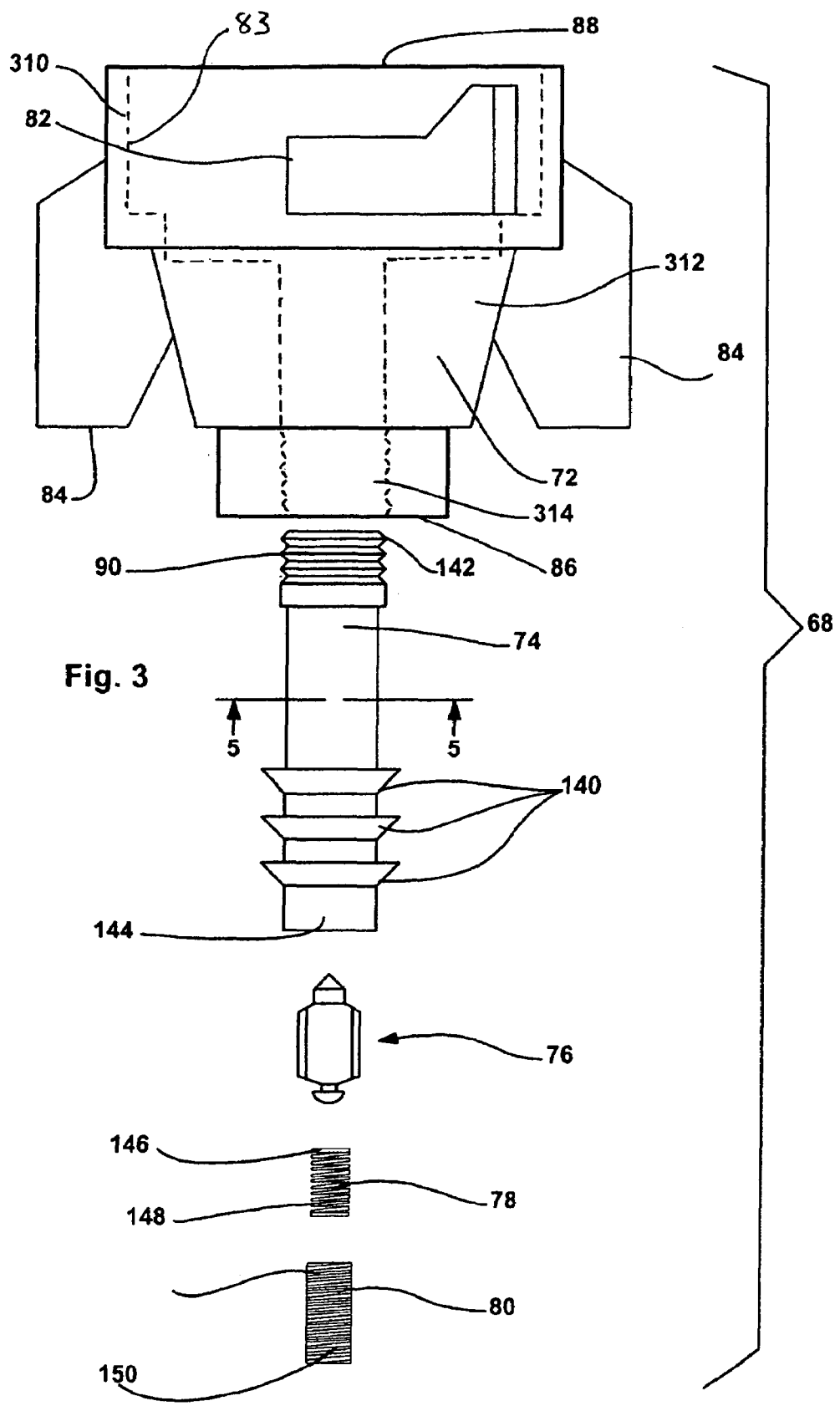
FIG. 3 is an exploded side elevational view of one of the valve assemblies of FIG. 2.
Figure 5:
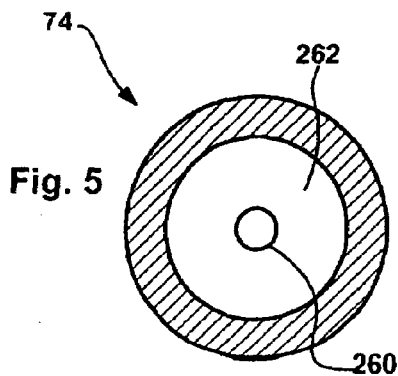
FIG. 5 is a cross-sectional view taken along the line 5-5 in FIG. 3.

Referring still to FIGS. 3 and 13, within sealing section 312 the internal surface of channel 83 forms an annular sealing surface 320 dimensioned to receive the annular sealing surface 304 formed at the distal end of nipple member 302. An elastomeric O-ring may be positioned between surfaces 320 and 304 to affect a hermetic seal. Within second coupling section 314 the internal surface of channel 83 is threaded.

Figure 8:
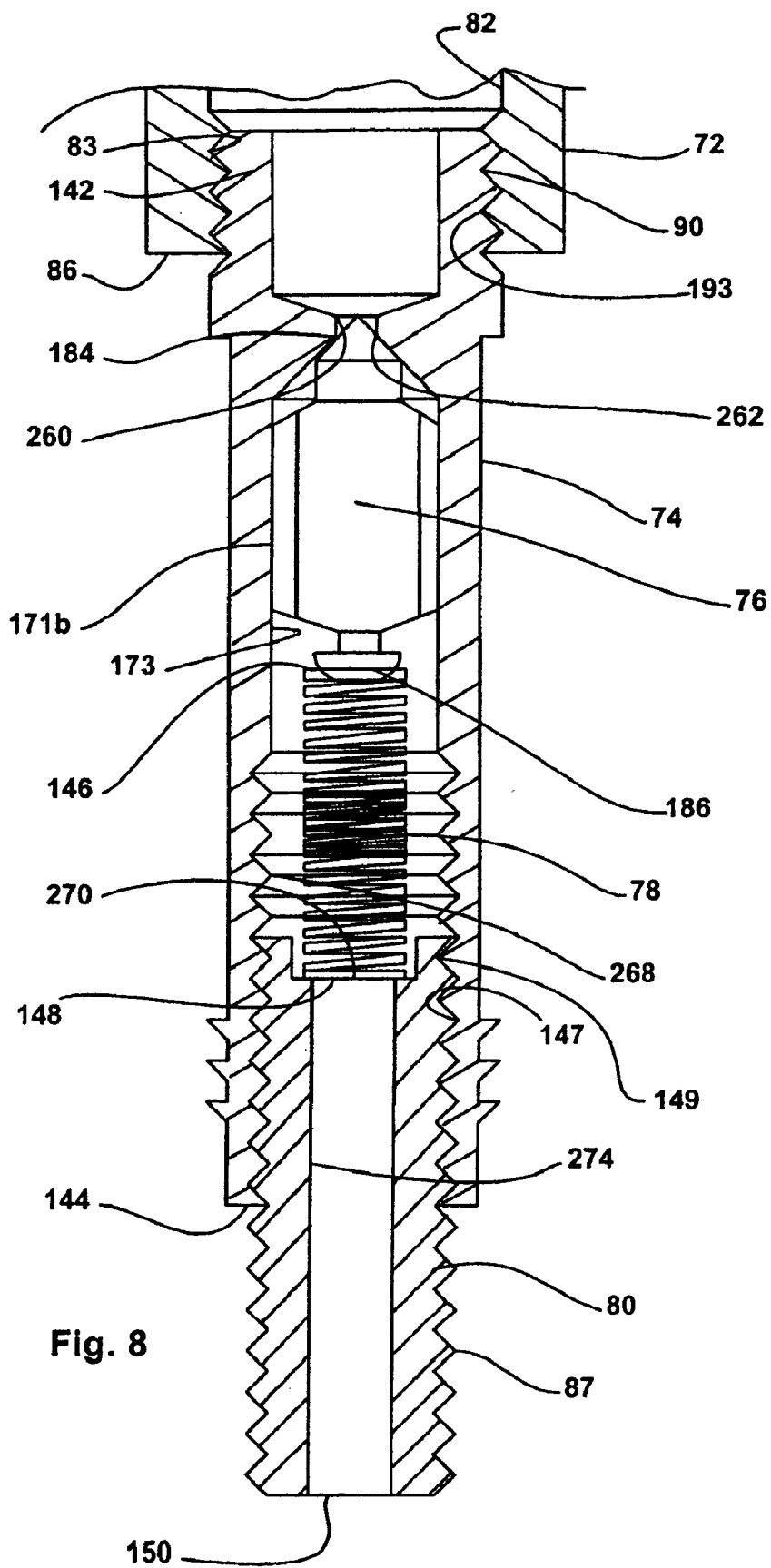
FIG. 8 is a partial cross-sectional view taken along the line 8-8 in FIG. 4 with the valve assembly in a closed state.

Referring still to FIG. 3 and also to FIG. 8, body member 74 is an elongated, rigid and generally cylindrical member having first and second ends 142 and 144, respectively, and forming a body member channel 173 that extends from the first end 142 through to the second end 144. The external surface of member 74 at first end 142 is threaded (see 90 in FIG. 3) with a thread that matches the pitch of the thread formed by channel surface 83 of coupling member 72 at the lower end 86 of member 72 so that first end 142 is threadably receivable within the lower end of channel 83. In addition, three ribs 140 are formed on the external surface of member 74 near second end 144. Ribs 140 are provided so that a tube 121 (see again FIG. 1) for delivering liquid fertilizer or the like can be securely mounted thereto by press-fitting the tube over members 140. If desirable, an additional mechanical clamping mechanism (not illustrated) may be provided to hold a tube 121 on to second end 144.

Referring still to FIG. 8, proximate first end 142 the internal surface of channel 173 is restricted and forms a reduced diameter orifice 260. In addition, referring also to FIG. 9, below orifice 260 channel surface 173 forms a valve seat surface 262 that generally faces downwardly and has a frusto-conical shape. While member 74 may be formed of any sufficiently rigid material, in at least some embodiments, member 74 is formed of steel and, most preferably, is formed of stainless steel.

Figure 6:
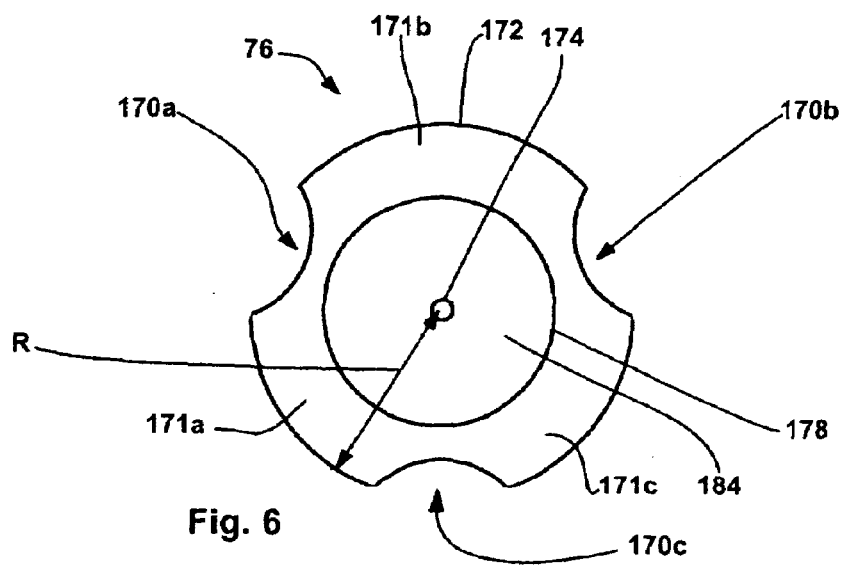
FIG. 6 is a top plan view of the closure member of FIG. 3.
Figure 7:
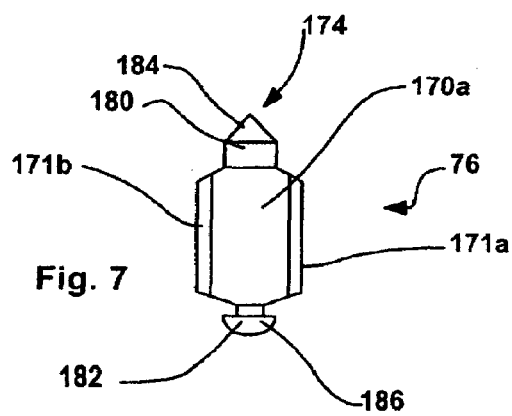
FIG. 7 is an enlarged view of the closure member of FIG. 3.

Referring still to FIG. 3 and also to FIGS. 6 and 7, closure member 76 is a rigid and, in some embodiments, stainless steel member including first and second ends 180 and 182, respectively, and an external surface 172 that defines various features of member 76 that are important to proper operation of the illustrated embodiment. More specifically, external surface 172 forms a conical closure surface 184 at first end 180 that has an apex 174 that faces away from second end 182. Conical surface 184 is configured and dimensioned such that it is snuggly receivable against seat surface 262 (see again FIG. 8) formed by body member 74 so that, when surface 184 is received against surface 262, no liquid passes therebetween.

Referring still to FIGS. 3 and 7, external surface 272 forms a bearing surface 186 at second end 182 of member 76 where bearing surface 186 generally extends in the direction opposite first end 180. Bearing surface 186 has specific dimensions which, as best illustrated in FIG. 8, enable at least a portion of surface 186 to be received within one end of helical spring 78 so that spring 78 is centered on surface 186 and with respect to member 76.

Between surfaces 184 and 186, external surface 172 is generally a cylindrical member having sections or channels of the external surface removed such that passageways are formed therealong generally along the length of member 76 between ends 180 and 182. For example, referring also to FIG. 6, in at least one embodiment of the present invention, portions of the external surface 172 are removed such that three generally equispaced channels 170a, 170b and 170c are formed along the length of member 76 between the first and second ends 180 and 182, respectively. Between each two passageways (e.g., 170a and 170b) a lateral guide member (e.g., 171a, 171b, 171c) is formed. The radius R of member 76 (see again FIG. 6) is slightly less than the radius formed by channel 173 within body member 74 (see again FIG. 8). Member 76 may be formed of any rigid material and, in at least some embodiments, will be formed of stainless steel.

Referring once again to FIG. 3, spring member 78 is, in at least the illustrated embodiment, a helical spring having first and second ends 146 and 148, respectively. Spring 78 is configured and dimensioned such that bearing surface 186 is at least partially receivable within first end 146 as described above. In addition, member 78 is dimensioned such that member 78 is receivable within channel 173 formed by body member 74.

Referring once again to FIG. 3, adjustment member 80 is a rigid cylindrical member having first and second ends 149 and 150, respectively. Referring also to FIG. 8, member 80 is threaded on its external surface (see 87 in FIG. 8) with a pitch that matches the pitch of the thread formed at the second end of body member 74 (see again 147 in FIG. 8) such that first end 149 of member 80 is threadably receivable within second end 144 of body member 74. As best seen in FIG. 8, in at least some embodiments, adjustment member 80 forms an internal channel 274 that extends between first and second ends 149 and 150, respectively. At first end 149, channel 274 is wider so that a rib or rim 270 is formed therein that faces out first end 149. Channel 274 is dimensioned such that second end 148 of spring member 78 is receivable within the wider portion of channel 274 formed at first end 149 and on rim 270 as illustrated.

To assemble valve assembly 68, referring to FIGS. 3 and 8, first end 142 of body member 74 is aligned with the threaded lower end of channel 83 and is threadably attached thereto. Next, first end 180 of closure member 76 is aligned with second end 144 of body member 74 and, more specifically, with the second end of channel 173, and is slid there into until closure surface 184 rests against seat surface 262. Continuing, spring 78 is aligned with channel 173 and is inserted into channel 173 until first end 146 contacts bearing surface 186. Next, first end 149 of adjustment member 80 is aligned with the threaded second end 144 of member 74 and is threadably attached thereto. Eventually, as member 80 is further threadably attached to the second end of member 74, rim 270 (see again FIG. 8) contacts second end 148 of spring member 78 and forces spring member 78 and closure member 76 against seat surface 262. Further rotation of member 80 causes additional pressure to be applied via spring 78 and member 76 between seat surface 262 and closure surface 184.

After the valve assemblies 68 have been assembled as described above, referring once again to FIG. 2, ach of the valve assemblies 68 is mounted with respect to a separate one of openings 79 to operate as an outlet for liquid fertilizer pumped into manifold 70.

Figures 9, 10:
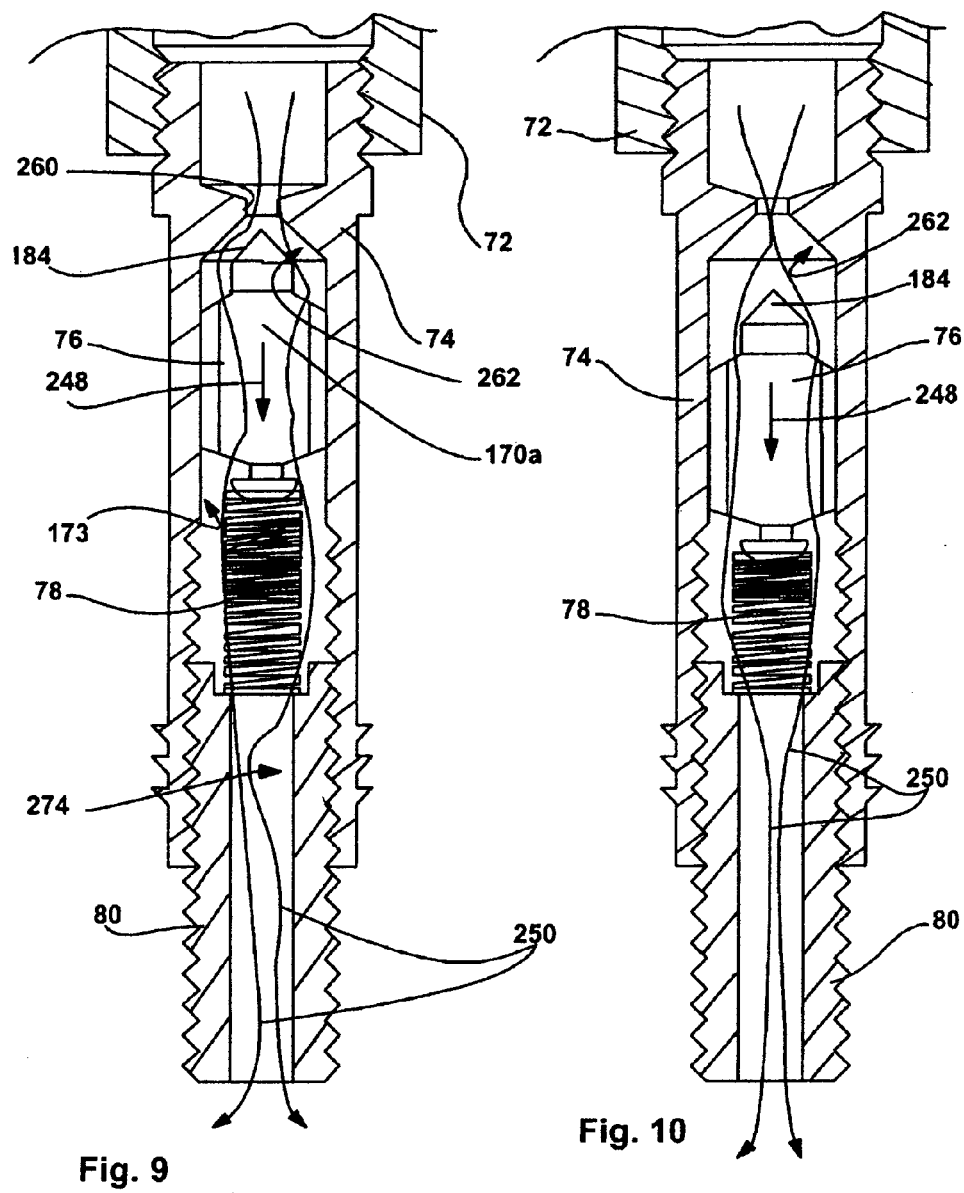
FIG. 9 is similar to FIG. 8, albeit illustrating the assembly in one open state.
FIG. 10 is similar to FIG. 9, albeit illustrating the assembly in a second open state.

In operation, referring still to FIG. 2A and also to FIGS. 8 and 9, with adjustment member 80 set to a specific relative location with respect to orifice 260, when pump 64 is turned on, the pressure within manifold 70 increases. If the speed of pump 64 is sufficient, the pressure within manifold 70 will increase to the point where the pressure forces each of valves 68 from a closed state into an open state. To this end, referring to FIG. 9, when a cracking pressure is achieved within manifold 70, the pressure above orifice 260 forces closure surface 184 off seat surface 262. Once an opening is formed between surfaces 184 and 262, liquid fertilizer passes along the trajectories indicated by arrows 250 from within the portion of channel 173 above orifice 260, through closure member channels (e.g., 170a), through spring member 78 and then through adjustment member channel 274. For any manifold pressure above the cracking pressure, the closure member 76 and spring member 78 will reach a steady-state orientation wherein the space defined by surfaces 184 and 262 remains steady. When pressure within manifold 70 is altered, the steady-state relationship between surfaces 184 and 262 changes. For example, referring also to FIG. 10, assuming a greater pressure within manifold 70 at least some of that pressure is relieved by spring 78 becoming further compressed and the space between surfaces 184 and 262 increasing as illustrated.

Figure 11:
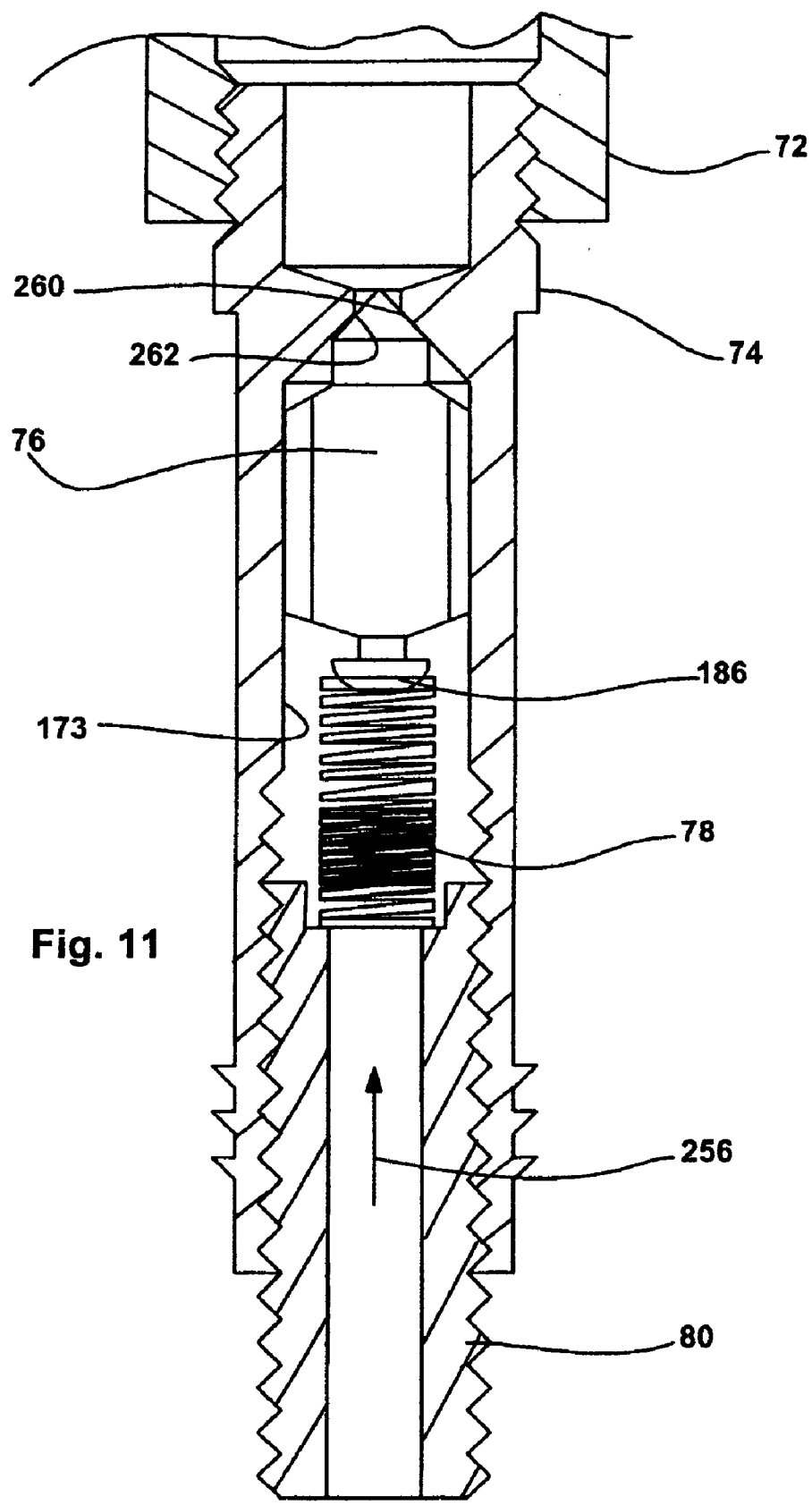
FIG. 11 is similar to FIG. 8, albeit illustrating the assembly in a closed state with the adjustment member in a second adjusted position that is different than the position illustrated in FIG. 8.

It should be appreciated that the cracking pressure of each valve assembly 68 may be adjusted by simply rotating adjustment member 80 in the clockwise or counter-clockwise direction to increase or decrease the pressure or force placed on closure member 76 by spring member 78. To this end, when member 80 is rotated such that member 80 is further received within channel 173, spring 78 is preloaded to a greater degree and therefore the cracking pressure for the assembly is increased appreciably. Similarly, by rotating member 80 in the opposite direction so that member 80 is received to a lesser degree within channel 173, spring member 78 loading is reduced and hence the cracking pressure of the valve assembly is also reduced. To this end, FIG. 11 illustrates the assembly of FIG. 9, albeit with adjustment member 80 further received within channel 173 such that spring member 78 is compressed to a greater degree in FIG. 11 than in FIG. 9. As described above, the cracking pressure for the valve assembly as adjusted in FIG. 11 would be greater than the cracking pressure for the valve assembly as adjusted in FIG. 9.

In at some embodiments of the present invention it is contemplated that the valve assemblies 68 may be configured so that they are adjustable by an ultimate end user (e.g., a farmer). In other cases, it is contemplated that the valve assembly 68 would be pre adjusted at a manufacturing facility prior to shipping for use. In either case, a jamming nut (not illustrated) or the like may be provided that is threadably receivable on the second end 150 (see again FIG. 8) of adjustment member 80 and that can be threadably jammed against second end 144 of body member 74 to lock the relative positions of body member 74 and adjustment member 80 unless affirmatively unjammed.

In at least some cases spring member 78 is selected and adjustment member 80 is set and locked with respect to body member 74 such that the pressure within manifold 70 ranges between 10 and 100 pounds per square inch (psi) for liquid fertilizer flow rates between 0.05 and 0.50 gallons per minute (gpm). In other cases, the pressure range will be between 15 to 50 psi for flow rates between 0.7 and 0.43 gpm.

Figure 12:
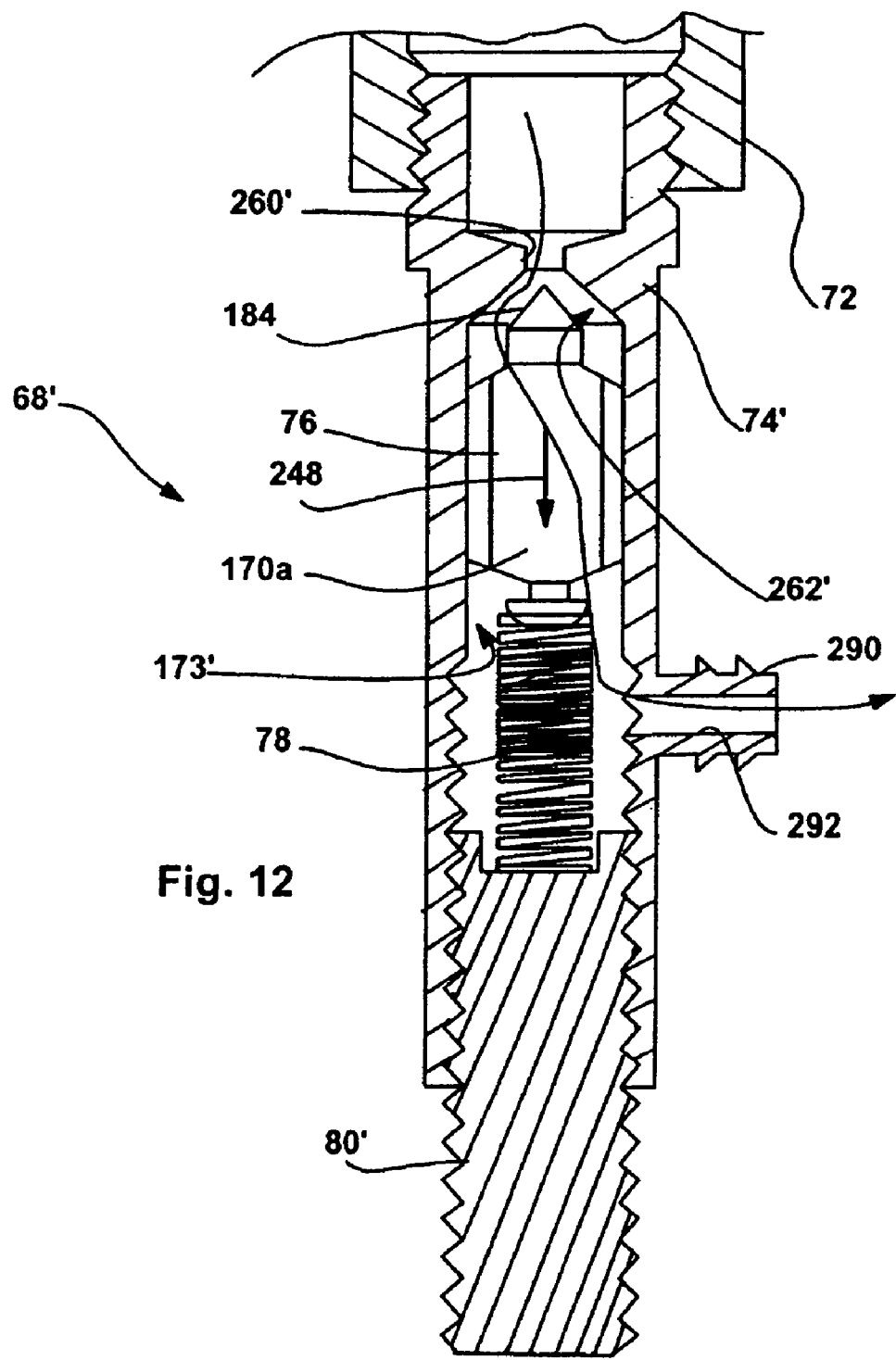
FIG. 12 is similar to FIG. 9, albeit illustrating another embodiment of the present invention.

Referring now to FIG. 12, one additional embodiment 68' of the present invention is illustrated. In FIG. 12, many of the components described above are identical and, therefore, in the interest of simplifying this explanation, will not be described again here in detail. Here, it should suffice to say that elements that are identical to the elements described above are identified by the same numerals and, elements or features that are similar but have some distinguishing characteristics are identified by the same numerals used above followed by a "'" . Moreover, new features of the embodiment illustrated in FIG. 12 are identified with new numerals.

Valve assembly 68' in FIG. 12 is generally different than the embodiment described above in that, adjustment member 80' does not form a channel but rather blocks flow out the second end of body member 74' and, body member 74' includes a lateral nipple 290 that extends laterally about mid-way along its length between its first and second ends and forms an outlet channel 292 that opens from body member channel 173'. In this case, as illustrated, when closure surface 184 is separated from seat surface 262', liquid passes between the space formed by surfaces 184 and 262', through the channels (e.g., 170a) formed by closure member 76 and out of channel 173' through lateral channel 292. In this case, delivery tubes, like tube 121 in FIG. 1 would be secured about nipple 290 in some suitable fashion to deliver liquid to the soil there below.

While the invention may be susceptible to various modifications and alternative forms, specific embodiments have been shown by way of example in the drawings and have been described in detail herein. However, it should be understood that the invention is not intended to be limited to the particular forms disclosed. For example, while threaded mating surfaces 173 and 87 are used above to adjustably couple adjustment member 80 to body member 74, other types of mechanical couplers are contemplated. Thus, the invention is to cover all modifications, equivalents, and alternatives falling within the spirit and scope of the invention as defined by the following appended claims.

To apprise the public of the scope of this invention, the following claims are made:

What is claimed is:

1. A valve assembly comprising:

a body member having an inner surface forming a channel having first and second ends, and forming a seat surface within and at the first end of the channel about an orifice that faces in the direction of the second end, the channel forming a first coupler at the second end;

a closure member extending along a longitudinally axis having a first end defining a closing surface, a second end including a reduced diameter portion defining an oppositely facing bearing surface, and an outer surface therebetween forming a slidable inner face with the inner surface of the body member, the closing surface configured to be received on the seat surface to close the orifice, the closing member received within the channel with the closing surface facing the seat surface, and the outer surface of the closure member including a plurality of circumferentially spaced channels formed therein that are generally parallel to the longitudinal axis;

a spring member having first and second ends and received within the channel with the first end of the spring member contacting and receiving at least a portion of the bearing surface therein; and an adjustment member having first and second ends and forming a second coupler at the first end of the adjustment member that cooperates with the first coupler to mechanically link the adjustment member within the channel in various relative juxtapositions;

one of the adjustment member and the body member forming an outlet passage from the channel;

whereby, the adjustment member position within the channel is adjustable to alter the degree of spring compression and also the pressure on the closure member.

2. The assembly of claim 1 wherein the adjustment member forms the outlet passage between the adjustment member first and second ends.

3. The assembly of claim 1 wherein the first coupler includes a threaded second end of the channel and the second coupler includes a threaded first end of the adjustment member.

4. The assembly of claim 3 wherein the body member channel is cylindrical and the adjustment member includes a cylindrical member wherein the passageway includes an adjustment member channel extending from the first to the second ends of the adjustment member.

5. The assembly of claim 4 wherein the adjustment member forms a rib within the adjustment member channel adjacent the first end of the adjustment member and wherein the second end of the spring member is dimensioned to be received within the second end of the adjustment member channel and received on the rib.

6. The assembly of claim 4 wherein the adjustment member is formed of steel.

7. The assembly of claim 1 wherein the body member includes an external surface and wherein at least one rib member is formed on the external surface that extends laterally therefrom about the external surface.

8. The assembly of claim 1 wherein the seat surface is formed of stainless steel.

9. The assembly of claim 8 wherein the body member is stainless steel.

10. The assembly of claim 1 wherein the spring member is loaded between the adjustment member and the bearing surface such that the closure surface opens from the seat surface when a minimum pressure is applied to the closure member through the orifice and wherein the opening between the seat surface and the closure surface increases as pressure greater than the minimum pressure is applied through the orifice until a maximum pressure occurs.

11. The assembly of claim 10 wherein the minimum pressure and maximum pressure are less than 30 pounds per square inch (psi) of pressure and greater than 40 psi, respectively and, wherein, the flow rates through the orifice at the maximum and minimum pressures are less than 0.15 gallons per minute (gpm) and greater than 0.30 gpm, respectively.

12. The assembly of claim 11 wherein the minimum and maximum pressures are 15 psi and 50 psi, respectively and, wherein the flow rates through the orifice at the maximum and minimum pressures are approximately 0.07 gpm and 0.43 gpm, respectively.

13. A valve assembly comprising:
a body member having an inner surface forming an annular channel having first and second ends, and forming an annular seat surface having a frusto-conical shape within and at the first end of the channel about an orifice that faces in the direction of the second end, the channel threaded at the second end;
a closure member extending along a longitudinal axis and having a first end defining a closing surface, a second end including a reduced diameter portion defining an oppositely facing bearing surface and an outer surface therebetween forming a slidable interface with the inner surface of the body member, the closing surface having a conical shape configured to mate with the frusto-conical shape of the seat surface to close the orifice, the closing member received within the channel with the closing surface facing the seat surface and the outer surface of the closure member including a plurality of circumferentially spaced channels formed therein that are generally parallel to the longitudinal axis;
a helical spring having first and second ends and received within the channel with the first end of the spring contacting and receiving at least a portion of the bearing surface therein; and
an adjustment member forming an annular outlet channel between first and second adjustment member ends, the adjustment member threaded at the first end of the adjustment member, the first end of the adjustment member threadably received within the body member channel and contacting the second end of the spring thereby at least partially compressing the spring and placing pressure on the closure member.

14. The assembly of claim 13 wherein the adjustment member forms a rib within the adjustment member channel adjacent the first end of the adjustment member and wherein the second end of the spring member is dimensioned to be received within the second end of the adjustment member channel and received on the rib.

15. The assembly of claim 13 wherein the body member is formed of stainless steel.

16. The assembly of claim 13 wherein the spring member is loaded between the adjustment member and the bearing surface such that the closure surface opens from the seat surface when a minimum pressure is applied to the closure member through the orifice and wherein the opening between the seat surface and the closure surface increases as pressure greater than the minimum pressure is applied through the orifice until a maximum pressure occurs.

17. The assembly of claim 16 wherein the minimum pressure and maximum pressure are less than 30 pounds per square inch (psi) of pressure and greater than 40 psi, respectively and, wherein, the flow rates through the orifice at the maximum and minimum pressures are less than 0.15 gallons per minute (gpm) and greater than 0.30 gpm.

18. The assembly of claim 17 wherein the minimum and maximum pressures are 15 psi and 50 psi, respectively and, wherein the flow rates through the orifice at the maximum and minimum pressures are approximately 0.07 gpm and 0.43 gpm, respectively.

19. A flow divider apparatus comprising:
a header member forming a header channel, at least one inlet and at least two outlets;
a liquid source linked to the header channel inlet;
a separate valve assembly for each of the header member outlets, each valve assembly including:
a body member having an inner surface forming a body member channel having first and second ends, forming a seat surface within and at the first end of the body member channel about an orifice that faces in the direction of the second end, the body member channel threaded at the second end, the first end of the body member linked to one of the header member outlets;
a closure member having an outer surface, a closing surface at a first end thereof, and a reduced diameter portion including an oppositely facing bearing surface at a second end thereof the outer surface including at least one passage and guide member formed therein, and the closing surface configured to be received on the seat surface to close the orifice, the closing member received within the channel with the closing surface facing the seat surface;

a spring member having first and second ends and received within the channel with the first end of the spring member contacting and receiving at least a portion of the bearing surface therein; and an adjustment member forming an annular outlet channel between first and second adjustment member ends, the adjustment member threaded at the first end of the adjustment member, the first end of the adjustment member threadably received within the body member channel and contacting the second end of the spring member thereby at least partially compressing the spring and placing pressure on the closure member.

20. The apparatus of claim 19 wherein the adjustment members are each separately adjusted so that when a minimum pressure is applied to the closure members via the orifices, each closure surface separates from an associated seat surface.

21. The apparatus of claim 20 wherein the adjustment members are each separately adjusted so that when a maximum pressure is applied to the closure members via the orifices, each closure surface separates from an associated seat surface approximately the same amount so that the flow rate through each of the valves is substantially similar.

22. The apparatus of claim 21 wherein the minimum pressure is 10 and 20 pounds per square inch (psi) and the flow rate at the minimum pressure is between 0.05 and 0.10 gallons per minute (gpm) and wherein the maximum pressure is between 40 and 60 psi and the flow rate at the maximum pressure is between 0.35 and 0.55 gpm.

23. The apparatus of claim 22 wherein the minimum pressure is approximately 15 psi and the flow rate at the minimum pressure is approximately 0.07 gpm and wherein the maximum pressure is approximately 50 psi and the flow rate at the maximum pressure is approximately 0.47 gpm.

* * * * *